United States Patent [19]

Anderson

[11] Patent Number: 5,218,925

[45] Date of Patent: Jun. 15, 1993

[54] ANIMAL SHELTER AND ENCLOSURE

[75] Inventor: John F. Anderson, Cannon Falls, Minn.

[73] Assignee: Regents of The Unversity of Minnesota, Minneapolis, Minn.

[21] Appl. No.: 915,468

[22] Filed: Jul. 16, 1992

[51] Int. Cl.$^5$ .................................................. A01K 1/00
[52] U.S. Cl. ............................................ 119/16; 119/19
[58] Field of Search ..................... 119/15, 16, 17, 19, 119/20, 27

[56] References Cited

U.S. PATENT DOCUMENTS

| 1,371,950 | 3/1921 | Tracy | 119/16 |
| 1,941,662 | 1/1934 | Cunningham | 119/19 |
| 2,008,637 | 7/1935 | Burrus et al. | 119/16 |
| 2,932,279 | 4/1960 | Giles | 119/19 |
| 4,372,251 | 2/1983 | Keith | 119/16 |
| 4,995,336 | 2/1991 | Deemer et al. | 119/19 |

FOREIGN PATENT DOCUMENTS

| 1158490 | 12/1983 | Canada | 119/19 |
| 23542 | of 1906 | United Kingdom | 119/19 |
| 369225 | 3/1932 | United Kingdom | 119/19 |

Primary Examiner—John G. Weiss
Attorney, Agent, or Firm—Kinney & Lange

[57] ABSTRACT

The present invention relates to an animal shelter having a baffled entrance. Snow and rain are kept out of the shelter by the baffled entrance while air is free to circulate into the shelter. A movable attached pen is provided in which the animal may exercise.

14 Claims, 4 Drawing Sheets

ANIMAL SHELTER AND ENCLOSURE

BACKGROUND OF THE INVENTION

The present invention relates to protective enclosures for housing animals, and more particularly to shelters that permit an animal to move freely in and out while blocking snow and rain from the shelter interior.

Animal shelters frequently make use of an open entrance to provide good ventilation to the shelter while permitting the animal to move freely in and out of the shelter. In climates where the weather may be severe, it becomes necessary to provide more protection from the rain and snow than an open entrance provides.

A protective structure for small animals is shown in U.S. Pat. No. 2,932,279 issued to Giles. The Giles patent makes use of a series of small holes through which a small animal may crawl to reach a rear chamber. Once in the rear chamber the small animal will be warm and safe from the elements and larger predators. The use of small holes limits the Giles structure to small animals.

SUMMARY OF THE INVENTION

The shelter or enclosure of the present invention is designed for use with larger animals such as calves or dogs. Pivoting doors are provided to allow easy access to the interior of the shelter for cleaning, feeding, and rebedding. A pen is attached to the shelter and can be adjusted in size by sliding it relative to the shelter. In one embodiment, a door carried by the pen will block a portion of the shelter opening when the pen is fully retracted.

In a preferred embodiment, the enclosure is generally rectangular having three side walls and a roof with one end being open. A pair of offset horizontally spaced doors are used to form a baffle entrance to permit ingress and egress while allowing ventilation and providing protection from high winds, rain, and snow.

A first door is pivotally mounted to one side wall approximately one-third of the way into the shelter from the open end and extends at least half way across the shelter when in a first position. The first door may be pivoted to a second position to lie flat against the first side wall when not needed. A second door is provided at the open end of the shelter and extends laterally from a second side wall, which opposes the first side wall, at least half way across the opening when the door is in a first position. The second door may be pivoted to a second position flat against the second side wall when not needed.

In one embodiment of the invention, a slidable pen is attached to the first and second side walls of the shelter. In this embodiment, the second door may be mounted to the slidable pen so that when the slidable enclosure is moved to a retracted or closed position, the second door blocks a substantial portion of the opening, while the first door is mounted as previously described.

DETAILED DESCRIPTION OF THE PREFERRED EMBODIMENTS

The present invention provides an animal shelter having a baffled entrance which keeps out snow during a snowstorm yet allows air to freely circulate. Doors form the baffle and are movable or pivotable, as will be described in more detail later, to facilitate snow removal, cleaning, or the rebedding of straw.

Figure 1:
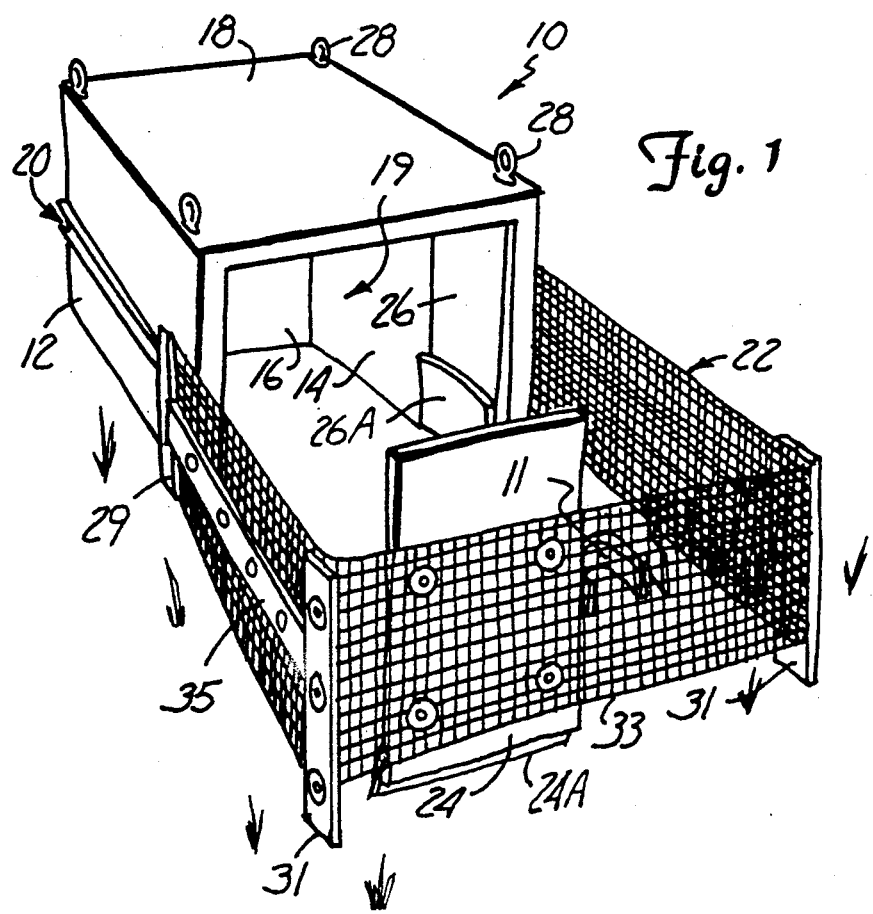
FIG. 1 is a perspective view of a preferred embodiment of the present invention with the slidable pen in an extended position.
Figure 2:
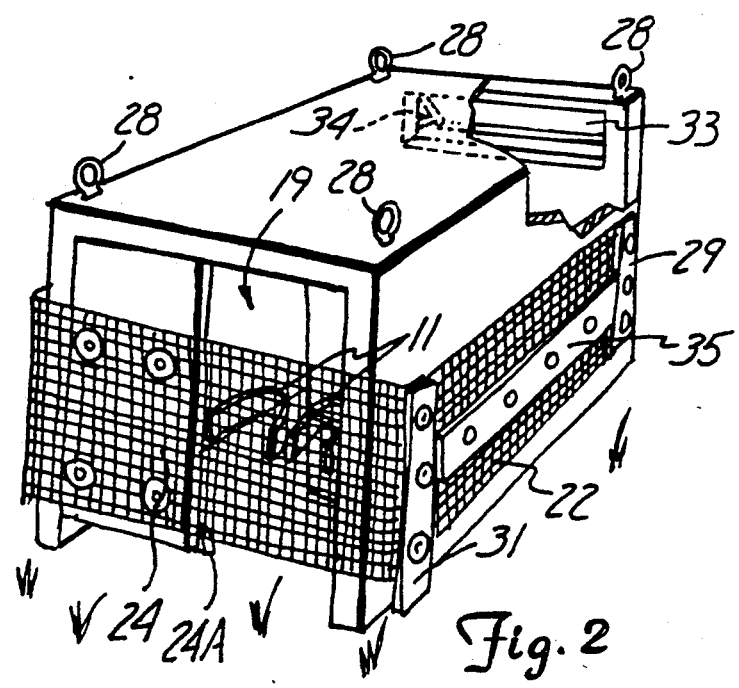
FIG. 2 is a perspective view of the embodiment of FIG. 1 with the slidable pen in a retracted position and a portion cut away to show a ventilation door.
Figure 3:
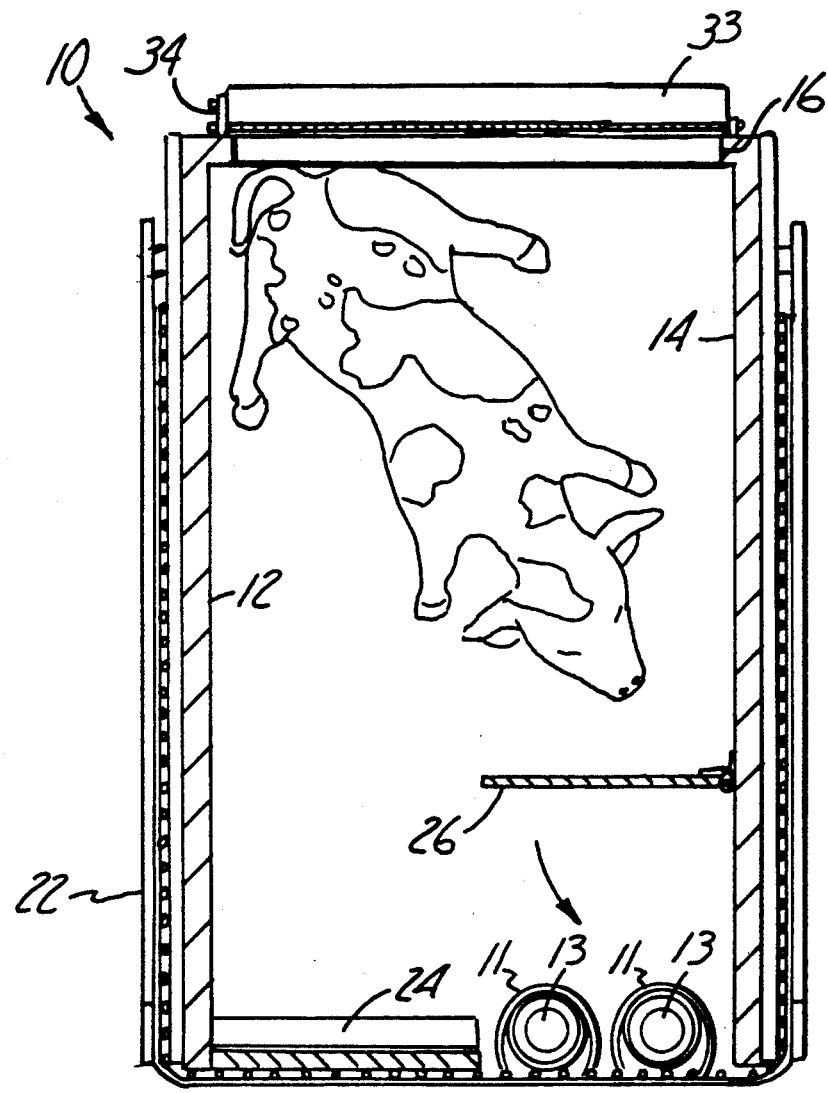
FIG. 3 is a top plan view of the embodiment of FIGS. 1 and 2 with the roof removed and the slidable pen in the retracted position and with a calf shown.

An animal shelter in accordance with the present invention is indicated generally at 10 in FIGS. 1-3 and includes side walls 12, 14 and 16 (the side wall 16 also being a rear wall 16), a roof 18, and an opening 19. The animal shelter 10 of the illustrated embodiment is of a size and type to house a calf, but the shelter is easily adaptable to house other animals such as dogs. The shelter of the present invention is made of wood, but it may be made of any suitable shelter material such as aluminum, fiberglass, or plastic that has an "R" value similar to plywood.

Figure 5:
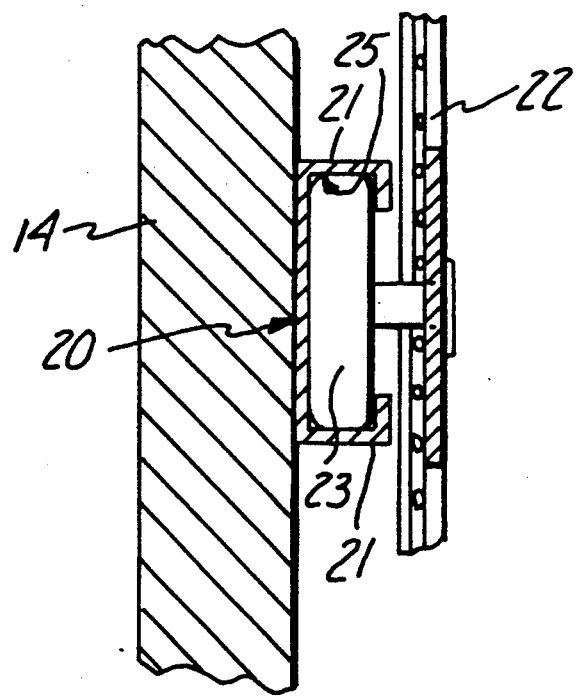
FIG. 5 is an enlarged end view of guide rails and a slidable member which forms a portion of the embodiment of FIGS. 1-4.

A pen 22 to allow exercise by the animal being sheltered is formed of rear supports 29 and corner supports 31. A fencing material 33, with side braces 35, extends generally parallel to the side walls 12 and 14 between the rear supports 29 and corner supports 31. Guide rails 20 are mounted to the outside of side walls 12 and 14 as shown in FIG. 1. As can be seen in FIG. 5, the guide rails 20 are formed to provide a channel 25 with retaining lips 21 to keep a sliding member 23 in the channel 25. Sliding members 23 are supported by the rear supports 29, in any known manner. Mounted to the pen 22 are feed straps 11. The straps 11 are sized to hold tapered feed and water or milk buckets 13 as shown in FIG. 3.

The pen 22 may be moved from an extended position as shown in FIG. 1 to a closed, or retracted, position as shown in FIG. 2. When the pen 22 is in its extended position, the calf or other animal is free to move about in the shelter 10 itself or outside in the penned area. When in the closed, or retracted, position as shown in FIG. 2, the animal is contained within the shelter 10.

Figure 4:
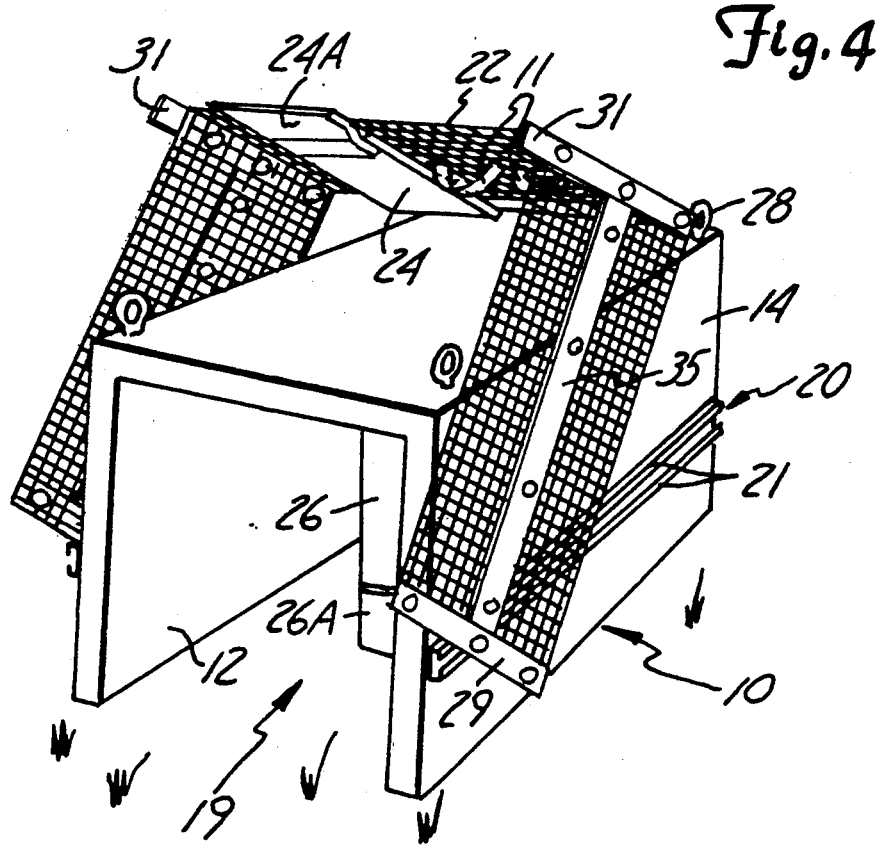
FIG. 4 is perspective view of the embodiment of FIGS. 1-3 with the slidable pen in a pivoted position.

To facilitate cleaning, rebedding, and feeding, the pen 22 may be pivoted over the shelter 10 as shown in FIG. 4. Sliding members 23 are held in the guide rails 20 by the retaining lips 21 which allows the enclosure to be pivoted. When in this rotated position, a hose or shovel may easily be used to clean the area. The rebedding of straw is also greatly facilitated when the pen 22 is in this position. The pen 22 may be made of any appropriate fencing material such as wire or chain link fence, or boards or panels and the like, the only requirement being that it be sufficiently rigid to retain its shape or that sufficient bracing or reinforcements are used.

A first door 26 is pivotally secured to side wall 14 as shown in FIGS. 1 and 3. As seen in FIG. 3, the first door 26 is positioned approximately one-third of the way back from the opening 19 on the side wall 14 (one-third of the way into the shelter interior). In a first position, the first door 26 is substantially perpendicular to side wall 14 and extends at least half way across the shelter 10. The first door 26 is pivotally mounted to allow the door 26 to be pivoted to a second position to be flat against the side portion 14 as shown in FIG. 1. A sweep 26A may be attached to the lower portion of the door 26, in a known manner. The sweep 26A is a flexible material such as nylon belting to accommodate different depths of straw.

A second door 24 is mounted to an end section of the pen 22 with common fastening means as seen in FIG. 1. When the pen 22 is in the retracted position, the second door 24 abuts against, and extends laterally from, side wall 12 at least half way across the opening 19 of the shelter 10. A sweep 24A, similar to the sweep 26A on the first door 26, may be attached to the lower portion of the second door 24.

When the first door 26 is in the first position, and the pen 22 is in the closed or retracted position as seen in FIGS. 2 and 3, a baffle effect is created by the doors 24 and 26, respectively. The baffle created by the doors 24 and 26 is very beneficial during inclement weather such as a snowstorm. In a snowstorm, for example, the baffle formed by the doors 24 and 26 allows air to circulate freely into the shelter while blocking snow from the shelter interior to keep it from piling up in the shelter around the calf. If two aligned doors are used in the opening of a shelter, the doors may be blocked with snow and thus restrict circulation of air to the animal inside. If no doors are used, snow is free to accumulate inside the shelter.

When the first door 26 is in its second position (flat against the side wall 14) and the pen 22 is in the extended position as seen in FIG. 1, the tasks of waste removal, snow removal, and rebedding of straw are greatly facilitated. Hooks or eyes 28 may be provided on the roof portion 18 of the shelter 10 to hold a lifting bar for easily moving the shelter 10 with a loader.

A ventilation door 33 is provided in rear wall to give added ventilation to the animal inside the shelter 10. The ventilation door 33 is approximately seven inches tall, it extends across the entire rear wall 16, and it may be positioned anywhere along the rear wall 16. The door 33 is hinged at the top to project outward, as seen in FIGS. 2 and 3, to keep rain out of the shelter 10. To hold the door 33 open, a chain and hook assembly may be used, or, as in the illustrated embodiment, a support leg 34 may be used.

Figure 6:
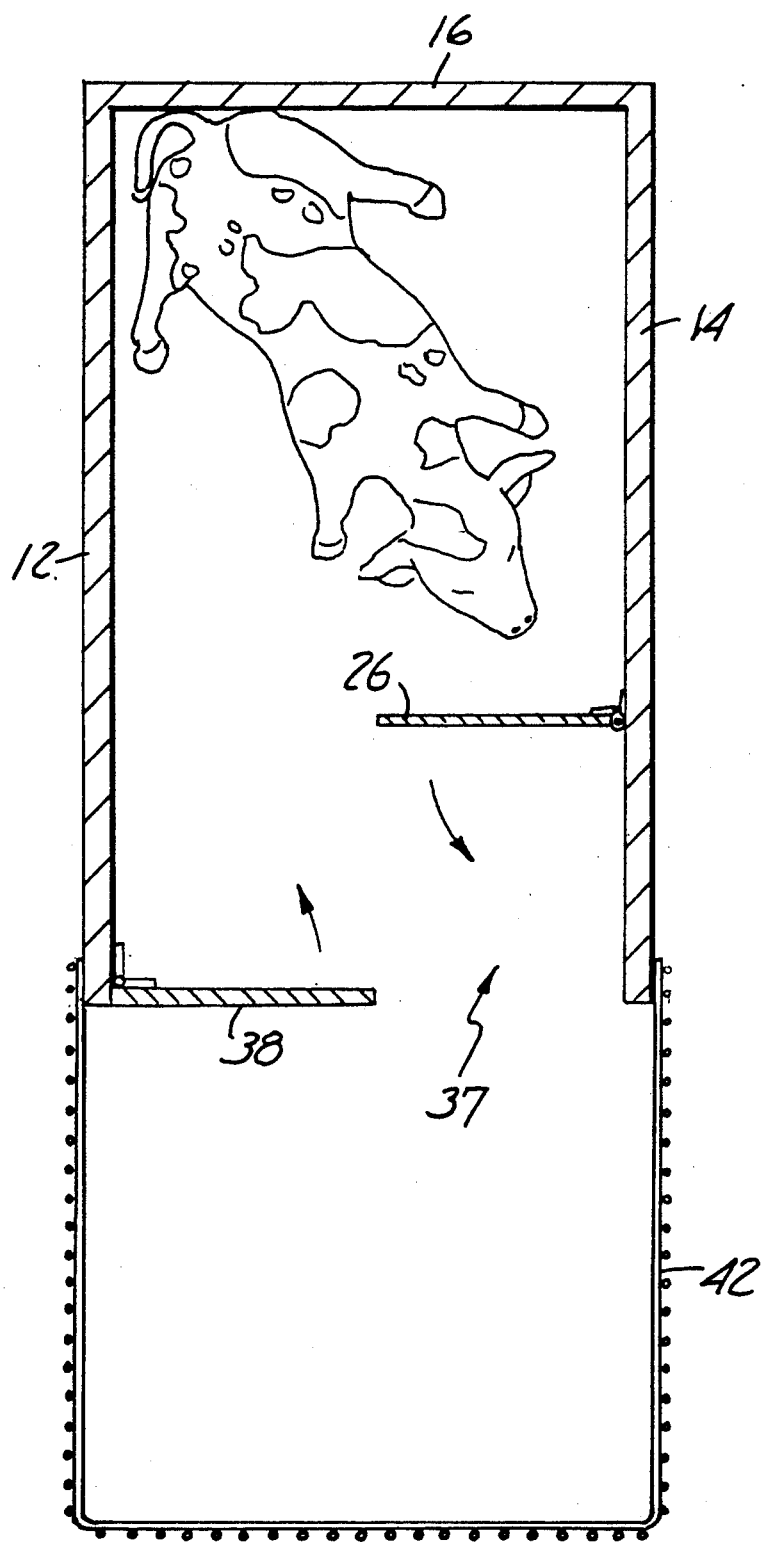
FIG. 6 is a top plan view of an alternative preferred embodiment of the present invention with the roof removed.

An alternative preferred embodiment of the present invention is shown in FIG. 6. The alternative embodiment includes side walls 12 and 14, rear portion wall 16, a roof 18 (not shown in FIG. 6), and an opening 37. A first door 38 is pivotally mounted to side wall 12 in the opening 37 as shown in FIG. 4. A second door 26 is pivotally mounted to side wall 14 as in the embodiment of FIGS. 1-5. In FIG. 6, the reference numerals designate elements similar or identical to the corresponding elements of FIGS. 1-5. When the second door 26 is in a closed position (substantially perpendicular to side wall 14) and the first door 38 is in a closed position (substantially perpendicular to side wall 12), both doors extend at least half way across the front opening of the shelter 30 resulting in a baffling effect similar to that discussed above with reference to FIGS. 1-5. A pen 22 can be fixedly attached to the shelter 30 as shown in FIG. 6. This alternative embodiment allows the present invention to be retrofitted onto existing calf hutches or other animal shelters.

Although the present invention has been described with reference to preferred embodiments, workers skilled in the art will recognize that changes may be made in form and detail without departing from the spirit and scope of the invention.

What is claimed is:

1. An animal shelter comprising:
   an enclosure including a roof, first and second opposing side wall portions and an entrance opening between the opposing side wall portions; and
   baffle means for blocking wind, snow or rain from the enclosure interior, the baffle means comprising at least one baffle smaller than the entrance opening and pivotally mounted to one of the side wall portions within the enclosure interior.

2. The animal shelter of claim 1 wherein the baffle means comprises two baffles.

3. The animal shelter of claim 2 wherein a second baffle is positioned on the second side wall portion substantially at and blocking a portion of the entrance opening, said one of the baffle means being spaced from the second baffle means within the enclosure interior.

4. An animal shelter comprising:
   an enclosure including a roof, first and second opposing side wall portions and an entrance opening between the opposing side wall portions; and
   baffle means for protecting the opening wherein the baffle means comprise two baffles, each of which are dimensioned to cover at least one-half of the width of the enclosure opening the first of the two baffles being adapted to be positioned to extend from the first side wall portion substantially and blocking a portion of the entrance opening and the second of the baffles adapted to extend from the second side wall portion at a position within the enclosure and spaced from the first baffle, the baffle means being movable to positions out of the entrance opening.

5. The animal shelter of claim 4 further comprising a slidable pen movably attached to the first and second side wall portions.

6. The animal shelter of claim 5 wherein at least one of the baffles is pivotally secured to a side wall portion.

7. The animal shelter of claim 6 wherein each of the baffles are pivotally secured to a different side wall portion.

8. The apparatus as in claim 5 wherein a first of the two baffles is attached to the pen, the pen being movable to a position relative to the enclosure such that the first baffle is generally within and blocks a portion of the entrance opening.

9. The apparatus as in claim 8 wherein a second of the two baffles is connected to the second side wall portion substantially inward from the opening.

10. The apparatus as in claim 9 wherein a second of the two baffles pivots to a position to be flat against the second side wall portion.

11. The apparatus as in claim 5 wherein the slidable pen may be pivoted over the enclosure.

12. An animal shelter which comprises walls having an entrance opening, and a retractable pen accessible from an interior of the animal shelter through the entrance opening, the retractable pen being pivotally and slidably mounted to the animal shelter to permit sliding and tilting of the pen relative to the animal shelter, a first door portion mounted to the pen such that when the pen is retracted to a closed position relative to the animal shelter the first door portion is generally within, and blocks at least a portion of the entrance opening.

13. The animal shelter of claim 12 further comprising a second door portion extending from a wall portion of the animal shelter to a position within the animal shelter and spaced inwardly from the first door portion, the second door portion being aligned with a portion of the entrance opening not blocked by the first door portion to deflect inflow of air through the entrance opening.

14. The animal shelter as in claim 13 wherein at least one of the first and second door portions is pivotally mounted.

* * * * *